United States Patent [19]
Castellon

[11] Patent Number: 5,464,251
[45] Date of Patent: Nov. 7, 1995

[54] TELESCOPIC SHAFT

[76] Inventor: Melchor Daumal Castellon, Diputación 455, Barcelona, Spain, 08013

[21] Appl. No.: 173,041

[22] Filed: Dec. 27, 1993

[30] Foreign Application Priority Data

Dec. 30, 1992 [ES] Spain ................................ 9202654
Mar. 31, 1993 [ES] Spain ................................ 9300654

[51] Int. Cl.⁶ ........................................... B62D 1/19
[52] U.S. Cl. ............................ 280/777; 188/371; 74/492
[58] Field of Search ............................ 280/777, 775; 188/371, 374, 376; 74/492, 493

[56] References Cited

U.S. PATENT DOCUMENTS

| | | | |
|---|---|---|---|
| 3,394,612 | 7/1968 | Bogosoff et al. | 188/371 |
| 3,470,761 | 10/1969 | Okamoto et al. | 280/777 |
| 3,492,888 | 2/1970 | Nishimura et al. | 280/777 |
| 3,600,970 | 8/1971 | Loofbourrow | 188/371 |
| 3,815,438 | 6/1974 | Johnson | 280/777 |
| 3,923,319 | 12/1975 | Nonaka et al. | 280/777 |
| 4,445,708 | 5/1984 | Oakes et al. | 280/777 |
| 4,509,386 | 4/1985 | Kimberlin | 188/371 |
| 4,674,354 | 6/1987 | Brand | 280/777 |
| 5,088,768 | 2/1992 | Maruyama et al. | 280/777 |
| 5,118,214 | 6/1992 | Petrzelka et al. | 188/374 |
| 5,193,848 | 3/1993 | Faulstroh | 280/777 |
| 5,342,091 | 8/1994 | Hancock | 280/777 |

FOREIGN PATENT DOCUMENTS

| | | | |
|---|---|---|---|
| 3822640 | 1/1990 | Germany | 280/777 |
| 4296229 | 10/1992 | Japan | 188/371 |

Primary Examiner—Mitchell J. Hill
Assistant Examiner—Peter C. English
Attorney, Agent, or Firm—Jacobson, Price, Holman & Stern

[57] ABSTRACT

A telescopic shaft for use in a motor vehicle steering column. The telescopic shaft comprises at least two tubular members of circular cross section which fit one into the interior of the other. The tubular members have longitudinally grooved regions which define a set of longitudinal ribs and are meshed with one another. Such meshing prevents relative rotational movement between the tubular members and allows relative axial movement therebetween. At least one of the tubular members includes at least one projection directed toward the other tubular member(s) and engaging an end of at least one longitudinal rib. Sliding of the tubular members with respect to one another can only occur when deformation of the longitudinal rib(s) engaged by the projection(s) also occurs. The telescopic shaft therefore provides a braking action whenever it is forcefully collapsed.

5 Claims, 3 Drawing Sheets

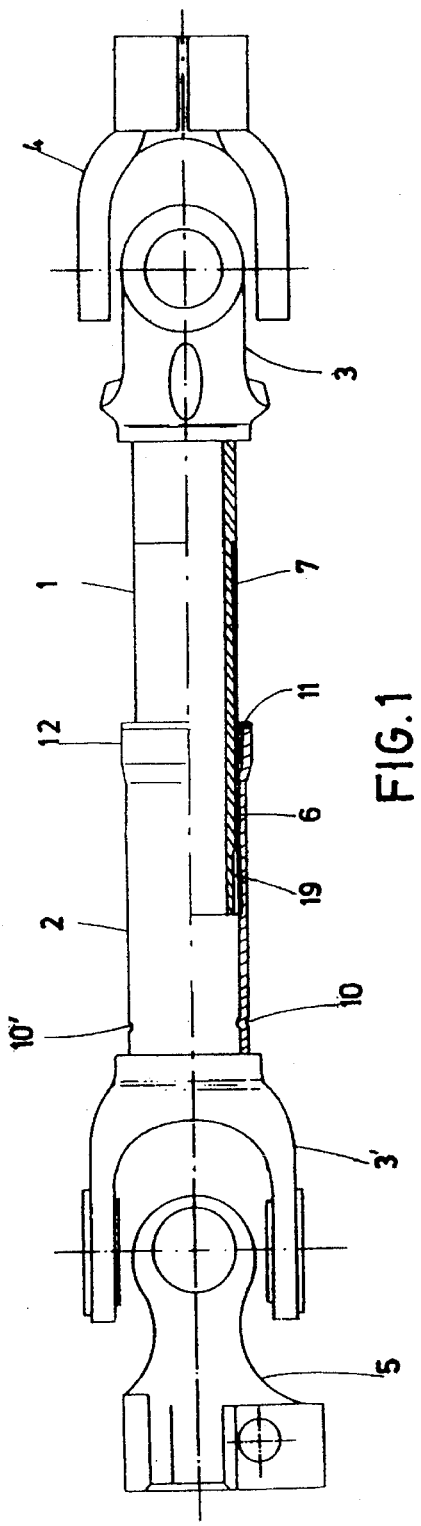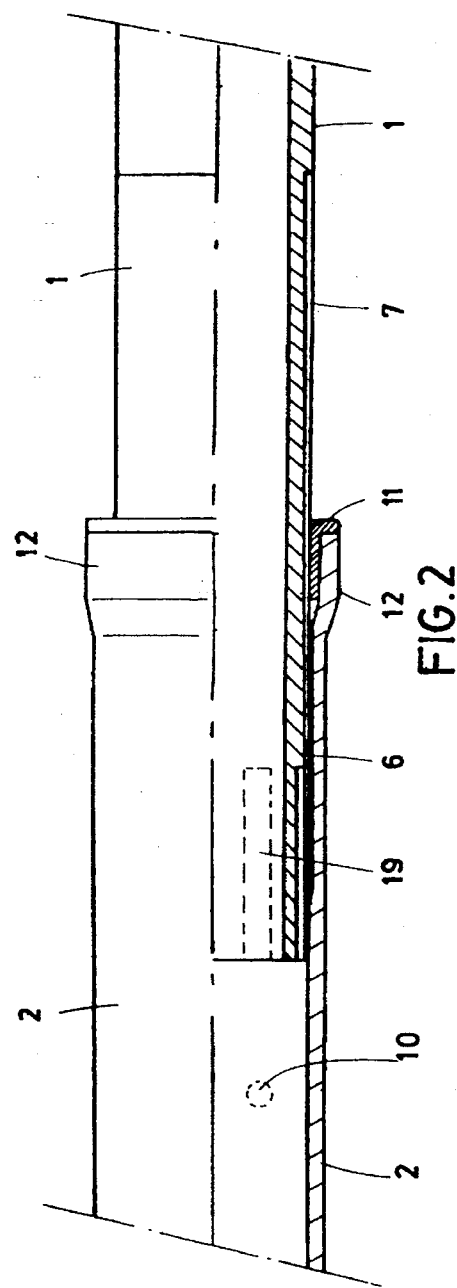

1

TELESCOPIC SHAFT

BACKGROUND OF THE INVENTION

The present invention relates to a telescopic shaft which can be integrated into the steering column of a motor vehicle, which steering column transmits the turning of the steering wheel to the steering box of the vehicle.

As is well known, steering shafts of motor vehicles are composed, in a general manner, of two portions or sections hinged to one another by way of a Cardan-type joint, comprising specifically a main portion or shaft, at one of the ends of which the steering wheel is fixed, and a secondary portion or shaft hinged to the opposite end of the main shaft and having another end hinged, by way of a Cardan-type joint, to the control kingpin of the steering box.

In the present state of the art, at least one of the shafts has a telescopic structure, comprising at least two tubular members, one of which is fitted inside the other and suitably retained in a specific relative position. The tubular members can be displaced from the specific relative position to thereby reduce the length of the assembly when the assembly is subjected to a predetermined force in the axial direction. This is done in this way mainly for reasons of safety, with a view toward avoiding very serious injuries which the steering column could otherwise cause to the driver or to the passengers of the vehicle, for example, as a result of a frontal collision. However, in the case of the secondary shaft or short portion of the column, the telescopic structure facilitates the mounting of this shaft in the vehicle, avoiding the need to use Cardan forks having an open flange, the disadvantages of which, with respect to the forks having a closed or semi-open mounting neck, are obvious and have already been widely recognized. Accordingly, several models of motor vehicles in which the space for mounting the secondary axle or shaft is particularly small, the shaft is composed, not of two, but of three telescopic elements, whereby the overall length of the shaft can be minimized at the time of mounting.

In the solutions which are presently known, the integral telescopic tubular portions of the shaft fit together by way of a region of non-circular cross section, for example polygonal, which provides a rotational coupling between the tubular portions. In one of these known solutions, the region of non-circular cross section of the male element of the telescopic system has rings of plastic material which are injected thereon, for example two in number, which act as friction elements against an outer female element, causing the relative sliding of these two members to occur only in response to a force of predetermined magnitude (generally between 80 and 200 kg). This solution is relatively simple, given that the rings can be injected directly, once the telescopic system has been mounted, through orifices provided in the female element. This solution, however, has the serious disadvantage of making it enormously difficult to obtain reliable and, above all, constant results, with regard to the magnitude of force which the telescopic system must withstand before a reduction in length occurs. In particular, this force depends upon a series of variables (quality of the plastic material, pressure at which the plastic material is injected, contractions which it experiences since injection, regularity and precision of the section of the two tubular elements, etc.) which are practically uncontrollable. In order to obviate these drawbacks it has already been proposed, according to another known solution, to provide on at least one of the rings of plastic material, projections of the same material which fit into corresponding orifices provided in the female tubular element and retain the two elements in a specific relative position. This solution makes it possible to calculate with an acceptable degree of accuracy the force which the telescopic system must withstand before deformation occurs, that is to say, the shear force necessary to break the projections. This solution, however, has the main disadvantage that, once these projections are broken, there is no longer anything to oppose the relative movement of the two members, so that the assembly no longer develops any braking or damping action. On the other hand, in the majority of known solutions the telescopic shaft can only collapse in response to a force of superior magnitude which, in turn, results from a collision or accident. The telescopic shaft, therefore, does not act like a telescopic shaft during mounting. Instead, during mounting and adjustment, the telescopic shaft acts like a rigid body of invariable length.

SUMMARY OF THE INVENTION

The disadvantages which have been pointed out have been radically remedied, with considerable simplicity of means, in the telescopic shaft which constitutes the present invention. According to the present invention, it is possible to control with a high degree of precision the magnitude of the force necessary to cause, as from a given position, the relative displacement of two tubular members of the telescopic system. And moreover, this force is kept constant during the entire relative displacement, the assembly acting like a perfect brake or damper, with a view toward absorbing the energy released in the collision. Furthermore, in accordance with the invention, it is possible to combine the assembly so that the force and the consequent absorption of energy increases in successive portions of the displacement of one tubular member with respect to the other. On the other hand, the system is perfectly compatible with the possibility of relative displacement of the telescopic members, so that it can be applied without disadvantages to main shafts, the length of which can be adjusted to vary the position of the wheel with respect to the driver of the vehicle, or to secondary shafts in which displacement is desired for first reducing the total length of the assembly and then increasing it to facilitate mounting.

For these purposes, in accordance with the invention, the rotational coupling between the tubular members of a telescopic system is effected by providing the tubular members with respective regions of successive longitudinal channels and ribs. These channels and ribs define teeth which mesh with one another. At least one of the tubular members includes at least one projection which is detained by at least one of the teeth to prevent relative displacement. However, if the axial force exerted is greater than a predetermined limit, deformation of the tooth occurs and this deformation continues along the length of the tooth together with relative displacement of the tubular members to thereby provide a braking effect of substantially constant magnitude and a consequent absorption of energy.

The essence and the main features and advantages of the invention will be more easily understood upon viewing the accompanying drawings, to which the explanation will refer hereinafter and in which—in a schematic form and, therefore, without restrictive character of any kind—some practical embodiments of the invention have been shown.

BRIEF DESCRIPTION OF THE DRAWINGS

FIG. 1 is a side view, partially sectioned, of a short or secondary integral shaft of a steering column, in accordance with the invention. However, it must be emphasized that the invention would be equally applicable to the main shaft of the steering column or other shafts intended for very different applications.

FIG. 2 is a detail, in diametric semi-section, of the telescopic part of the same shaft shown in FIG. 1.

And finally.

DETAILED DESCRIPTION OF THE PREFERRED EMBODIMENTS

Figure 3:
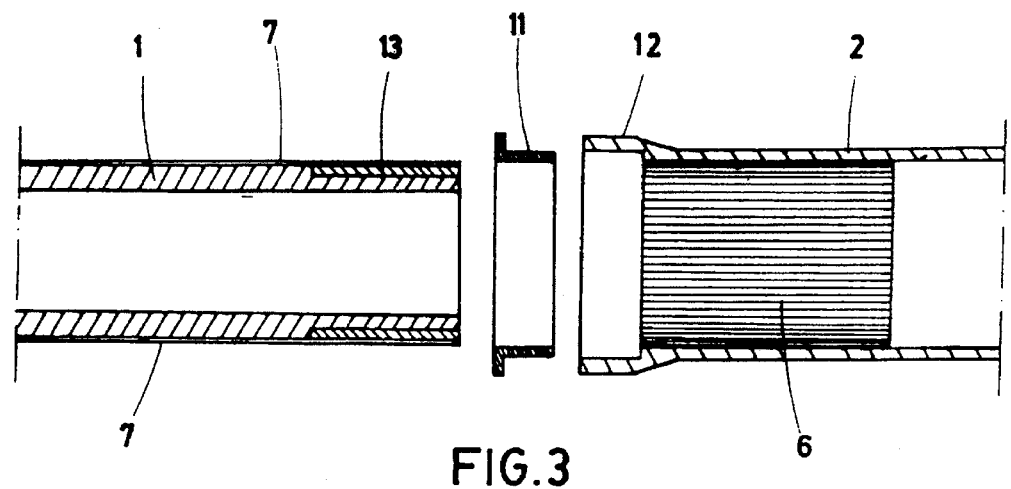
FIG. 3 is an exploded view, in diametric section, of the same elements shown in FIG. 2.
Figure 4:
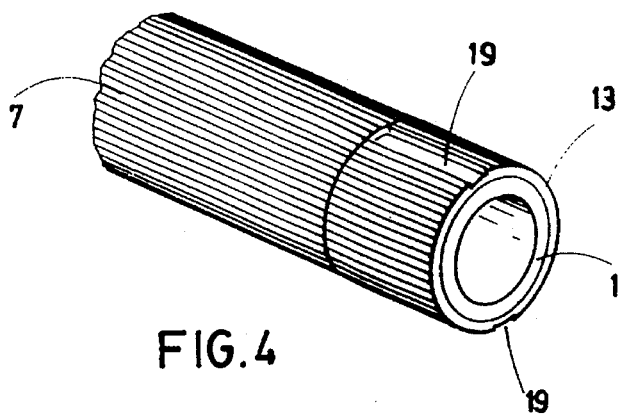
FIG. 4 is a perspective view of the end of the male member of the telescopic system.
Figure 5:
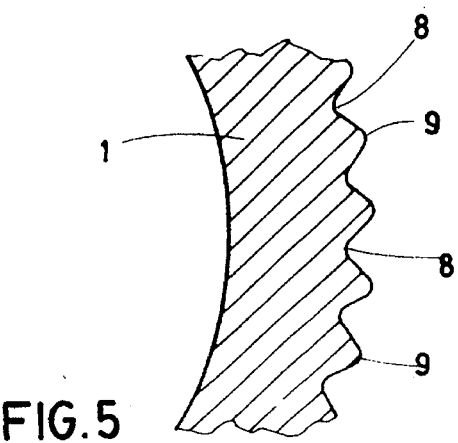
FIG. 5 is an enlarged cross section, showing the longitudinal grooving or teeth by means of which the rotation of two tubular members is coupled in the telescopic system.

The shaft shown in FIG. 1 comprises two telescopic members 1,2. The two telescopic members 1,2 include forks 3,3' which are connected to free ends of the telescopic members 1,2. The forks 3,3' are coupled, by means of corresponding crossheads which form Cardan-type joints, respectively, to the fork 4 which is connected to the kingpin of the steering box, and to the fork 5 which is connected to the end of the main shaft. As has already been stated, the arrangement of the present invention can also be applied to this main shaft, in which case, it will be understood that the free end of one of the telescopic members would be coupled to the fork 5, while the free end of the other member would be coupled, by any suitable system, to the steering wheel.

The rotational coupling between the members 1 and 2 of the telescopic system is effected by providing on the inner surface of the outer member 2 and on the outer surface of the inner member 1 of respective peripheral regions 6,7, a succession of channels 8 and ribs 9, arranged in the longitudinal direction and provided, for example, with an approximately triangular cross section, which defines an arrangement of teeth. The toothed regions defined by the arrangement of teeth fit together, allowing and guiding the axial sliding of one member with respect to the other and ensuring a rigid rotational coupling between both members. These toothed regions can be obtained with much precision using techniques which are already known, for example, by lamination, by means of the conventional toothed rules or "racks", or, preferably, by forced passage of the tubes which constitute the members through orifices or dies of suitable shape.

In accordance with the invention, on at least one of the two telescopic members 1,2, there is provided at least one small projection 10 directed towards the other member. In the more normal and preferred embodiment of the invention, the projection 10 is arranged on the outer member or female member, and juts out from the inner surface of the outer member. The projection 10 can be obtained by means of a simple pressing operation. However, with the same effect, although with certain difficulties in obtaining it, the projection could also be provided on the outer surface of the male or inner member 1. Likewise, with the main purpose of balancing forces, two diametrically opposite projections can be provided, instead of a single one. It is further understood that, without disadvantages, this number could be increased to three, four or more.

When the male tubular member 1 occupies, with respect to the female tubular member 2, a position in which the projection 10 is remote from the grooved region 7, the projection 10 will not exert any action and freely allows axial movement of one member with respect to the other. However, when the projection 10 reaches the end of the ribs 9 during sliding of the member 1 towards the interior of the member 2 to shorten the total length of the assembly, a stop effect will occur. According to this stop effect, movement will be able to continue only by means of a deformation of at least one of the ribs, which deformation, as is logical, will exert a specific force, calculable with a good degree of precision, which will be prolonged, staying substantially constant along the entire rib.

In a preferred, but not necessary, embodiment, the axial movements of the member 1 with respect to the member 2 will be guided to avoid noise and vibrations by two elements molded using a material having a certain degree of elasticity. In addition, one of the elements can be used to establish a system of stops in a single direction, which eliminates the possibility that the telescopic system will be demounted. The first of these elements is constituted by a hoop 11 which fits and is fixed to an end mouthpiece or mouth 12 provided in the outer member 2. The inner member 1 fits into the interior of this hoop 11, and is able to slide with respect to the hoop 11. The second of the elements is constituted by a coating of plastic material 13 directly molded over the end of the inner member 1, or possibly, incorporated in the inner member by any other system whatsoever. The outer member 2 slides on the coating of plastic material 13. This coating also includes outer longitudinal grooving, extending as a continuation of the grooved region 7 and capable, consequently, of meshing with the grooved region 6 of the outer member. These elements, and in particular the hoop 11, develop a friction which constitutes a so-called "fitting effort". Finally, the coating 13 can have longitudinal channels 19 which allow free passage of the projections 10, so that these projections act exclusively on the metallic ribs 9 and not on the molded ribs which extend therefrom.

Figure 6:
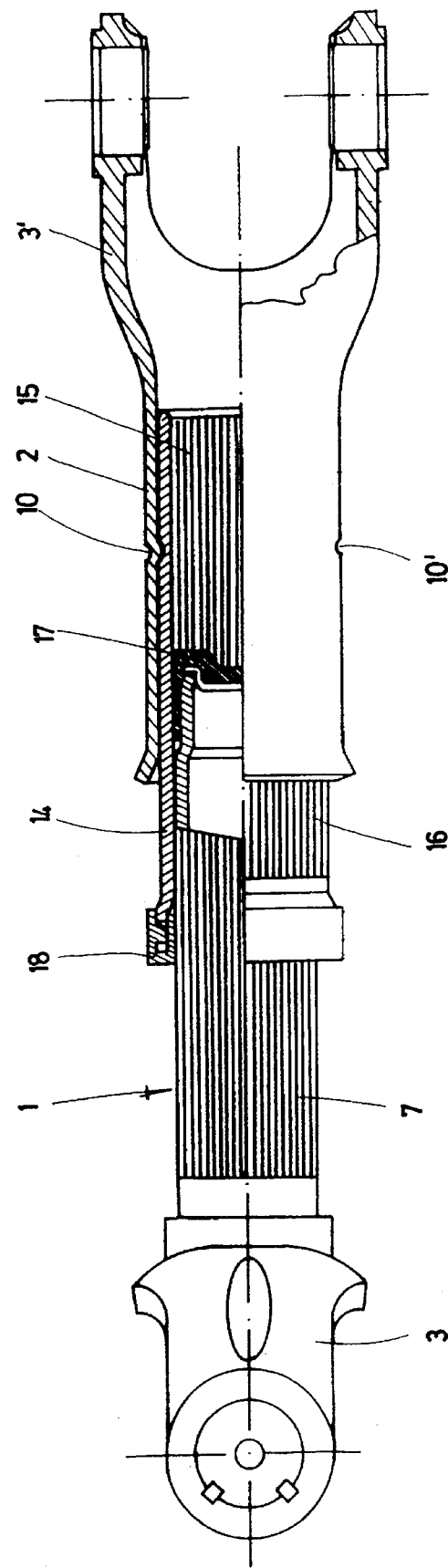
FIG. 6 is a side view, partially sectioned, of a telescopic shaft composed, not of two, but of three tubular members, in accordance with the present invention.

In FIG. 6, there is shown an example of an application of the invention to a telescopic system formed, not by two, but by three tubular members fitted concentrically with respect to one another. As can be seen in this Figure, the male member 1 is connected to a Cardan fork 3, and the female member 2 is connected to the fork 3', which connections, in this example, are made integrally. Between the male member 1 and female member 2, there is inserted a third or intermediate tubular member 14 which fits in the female member 2 and receives the male member 1. This intermediate tubular member is provided with longitudinal grooves or teeth both on its inner surface 15 and on its outer surface 16. The toothing of the inner surface 15 meshes with the external toothing 7 of the member 1, thus maintaining a rotational coupling between the intermediate tubular member 14 and the male member 1. Likewise, the external toothing on the outer surface 16 meshes with the internal toothing 6 of the female member 2, thus maintaining a rotational coupling between the intermediate tubular member 14 and the female member 2. Consequently, a rotational coupling is maintained between the male and female members 1 and 2.

The first (or male) tubular member has, on its end opposite to the one occupied by the fork 3, a bushing 17. Preferably, the bushing 17 is made of plastic material, for example, molded directly onto the end of the member 1. This bushing 17 produces a friction with the intermediate shaft 14, which opposes relative sliding, in both directions, of one member with respect to the other, causing the so-called "fitting effort".

The intermediate tubular member 14 comprises, integral with its end, a bushing 18, also preferably of plastic material. The bushing 18, for example, can be molded directly onto the end of the intermediate tubular member 14, fitted under pressure, etc., the main function of which is to limit the possibility that the male member 1 will slide completely out. Thus, the male member 1 is prevented from emerging totally from the intermediate member 14. Other functions of the bushing 18 include enhancing the frictional force referred to hereinabove and avoiding noise and vibrations.

And finally, the female tubular member 2 has at least one deformation 10 (normally, two diametrically opposite deformations 10,10') arranged to act on the outer longitudinal ribs at surface 16 of the intermediate tubular member 14, in the form and with the consequences which have already been sufficiently described in defining the essence of the invention.

The functioning of the telescopic shaft described cannot be more simple and obvious from the above description. To accomplish the mounting, one of the end forks 3,3' will have to be connected to the fork located at the end of the upper or main shaft or to the fork connected to the kingpin of the steering box of the vehicle. For this, the length of the telescopic assembly will be reduced, and this is accomplished by introducing the male tubular member 1 into the intermediate tubular member 14 as far as the limiting position defined by the end of this latter member will permit. In doing so, a frictional force will have to be overcome, which frictional force is caused mainly by the inner bushing 17 and will be calculated in accordance with the technical specifications to be satisfied in each case. Once the mounting has been accomplished, the extension of the shaft will be effected by way of a partial extraction of the tubular member 1 to the extent necessary for each application. In particular, the tubular member 1 is extracted until it is possible to accomplish the fixing of the unattached fork. Normally, in this mounting position, the entire shaft will have an intermediate length, so that the adjustment stroke will be in a position to absorb the axial movements of the upper shaft and/or of the shaft of the pinion. On the assumption that an impact occurs, in a first phase, the first or male tubular member 1 will penetrate into the interior of the intermediate member 14 offering a weak resistance. At the moment when that member reaches the limiting position with respect to such penetration, the movement of the intermediate tubular member 14 with respect to the female tubular member 2 is initiated. At this moment, the effort of penetration increases as far as the specified collapse load, and the movement continues, with energy being absorbed by this movement which in each case may have been programmed.

It is understood that, apart from and in addition to the variations which have already been expressly pointed out, within that which constitutes the essence of the invention, it is possible to imagine other modifications and embodiments which, as is logical, will have to be considered likewise included within the scope of protection of the patent. In particular, it is fitting to point out the possibility of providing on one of the members of the telescopic system two or more deformations or projections 10 arranged to act on the ribs of the other tubular member, these projections being arranged on different transverse planes with respect to the corresponding tubular member. By providing this arrangement, when the axial displacement of one tubular member with respect to the other occurs, these different deformations will come into action on the corresponding ribs, not simultaneously, as would occur if they were situated on the same transverse plane, but successively, causing a progressively greater braking effort, which would oppose the displacement. Especially in this latter arrangement, it would also be possible that the various deformations or projections were not all equal, so that the effort of deformation which such projections would exert on the corresponding ribs would also be different.

I claim:

1. A telescopic shaft for use in a motor vehicle steering column, comprising two tubular members of circular cross section which fit one into the interior of the other and which have respective longitudinally grooved regions defining longitudinal ribs, meshed with one another, said longitudinal ribs preventing relative rotational movement between the two tubular members and allowing relative axial movement between the two tubular members, at least one of said tubular members having at least one projection directed toward the other tubular member and engaging an end of at least one of the longitudinal ribs defined by the grooved region in said other tubular member, said at least one projection being substantially less deformable than said longitudinal ribs so that the sliding of one of the tubular members with respect to the other tubular member can only occur by means of the deformation of said at least one of the longitudinal ribs under the action of said at least one projection.

2. The telescopic shaft according to claim 1, wherein one of the tubular members has at least two of said projections, said at least two of said projections being disposed on a common transverse plane and being of equal size.

3. The telescopic shaft according to claim 1, wherein one of the tubular members has at least two of said projections, said at least two of said projections being disposed on different transverse planes, in a position to act successively on the longitudinal ribs of the other tubular member.

4. The telescopic shaft according to claim 1, wherein said at least one projection comprises at least one projection formed on an inner surface of an outer one of the two tubular members.

5. A telescopic shaft for use in a motor vehicle steering column, said telescopic shaft comprising three tubular members of circular cross section, said three tubular members being coaxially arranged with respect to one another and interconnected telescopically, said three tubular members having contact surfaces defined at portions of said three tubular members where said three tubular members are interconnected, each of said contact surfaces having a succession of longitudinal grooves and longitudinal ribs which define teeth, said teeth being arranged so as to mesh with one another to rotationally couple the three tubular members, while permitting axial sliding of the three tubular members with respect to one another with controlled effort, wherein two of said three tubular members define a pair of end tubular members, said end tubular members being interconnected by an intermediate one of said three tubular members, said axial sliding being opposed by means for providing a predetermined frictional force between a first one of said end tubular members and the intermediate one of said three tubular members, at least one projection being disposed between a second one of said end tubular members and said intermediate one of the three tubular members, said at least one projection being substantially less deformable than said longitudinal ribs and being arranged so as to engage an end of at least one of said longitudinal ribs, thereby limiting axial sliding of said second end tubular member with respect to the intermediate one of the three tubular members to instances of said axial sliding which result in deformation of said at least one of said longitudinal ribs.

* * * * *